S. PEACOCK.
PROCESS OF MAKING PRIMARY AMMONIUM PHOSPHATE.
APPLICATION FILED SEPT. 2, 1909.
988,734.
Patented Apr. 4, 1911.
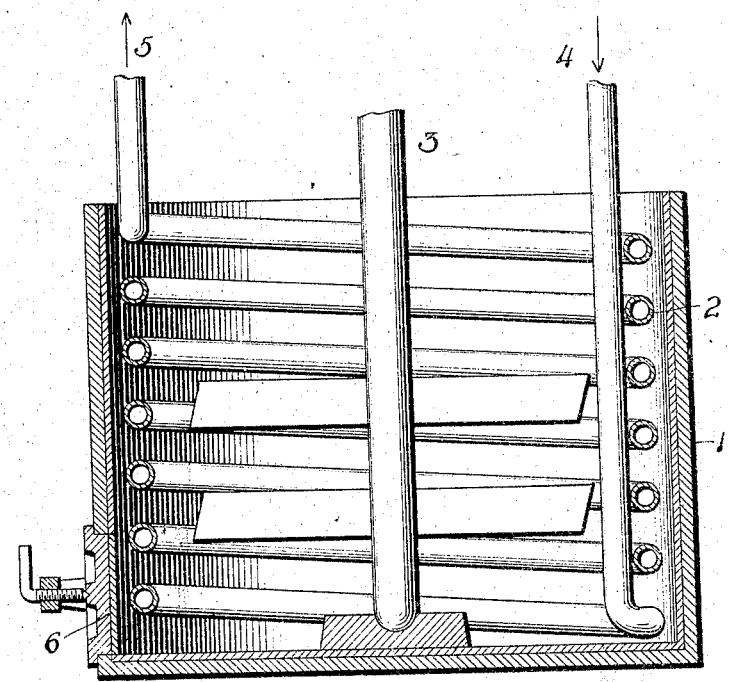
WITNESSES:
Byron B. Collings
INVENTOR
S. Peacock
BY Wilkinson Fisher &
Witherspoon
Attorneys

UNITED STATES PATENT OFFICE.

SAMUEL PEACOCK, OF CHICAGO, ILLINOIS, ASSIGNOR TO AMERICAN CYANAMID COMPANY, OF NEW YORK, N. Y., A CORPORATION OF MAINE.

PROCESS OF MAKING PRIMARY AMMONIUM PHOSPHATE.

988,734.  Specification of Letters Patent.  Patented Apr. 4, 1911.

Application filed September 2, 1909. Serial No. 515,807.

*To all whom it may concern:*

Be it known that I, SAMUEL PEACOCK, a citizen of the United States, residing at Chicago, in the county of Cook and State of Illinois, have invented certain new and useful Improvements in Processes of Making Phosphate Ammonia; and I do hereby declare the following to be a full, clear, and exact description of the invention, such as will enable others skilled in the art to which it appertains to make and use the same.

This invention relates to a process for making phosphate of ammonia, from commercial acid phosphate and sulfate of ammonia, in a simple and comparatively inexpensive manner, and to this end, the invention consists in the novel steps and combinations of steps constituting my process, more fully hereinafter disclosed and particularly pointed out in the claims.

Crude calcium phosphate $(CaO)_3.P_2O_5$ as mined contains lime (CaO) and phosphoric anhydrid or phosphorous pentoxid $(P_2O_5)$ combined in the proportions of three (3) chemical equivalents of the former to one (1) chemical equivalent of the latter. In this state of combination, the phosphoric anhydrid is neither soluble in water, nor in the weak acids of the soil. Hence, in order to render the phosphoric anhydrid available to the assimilating powers of growing plants, phosphate rock is ordinarily treated with sulfuric acid, which combines with somewhat less than two thirds of the lime already combined with the phosphates, which forms hold the phosphoric anhydrid so loosely that growing plants are enabled to assimilate the phosphoric anhydrid combined therewith.

The two forms of lime phosphates known respectively as mono-calcium phosphate and di-calcium phosphate, may be obtained by the following reactions:

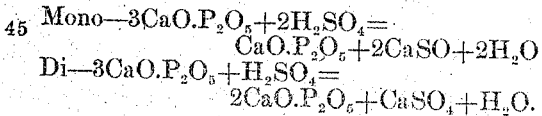

The mono- and di-calcium phosphates are of practically equal agricultural value, and are termed "available" forms of phosphorus by the various State fertilizer control laws, all as is well known.

In making acid phosphate, it would be a saving of sulfuric acid to convert the tri-calcium phospate into di-calcium phosphate only, but there are practical difficulties in securing such exact work in routine factory operations. Consequently, as a practical fact, commercial acid phosphate contains about one-fourth of its total "available" phosphoric anhydrid in the form of di-calcium phosphate, and three-fourths in the form of mono-calcium phosphate. The sulfuric acid used in producing "available" phosphoric acid (anhydrid) remains in the acid phosphate, in the form of sulfate of lime; which on some soils is of no utility as a fertilizer.

The object of my process more specifically stated is to avoid these objections, and to convert the phosphoric acid contained in the acid phosphate, into phosphate of ammonia, by leaching the same, for example, from the insoluble sulfates of lime, and producing thereby a water soluble, (and highly "available") form of phosphoric acid, all as will now appear.

Referring to the accompanying drawings forming a part of this specification in which the figure is a diagrammatic view of an apparatus involving the principles of my process:—1 represents any suitable container, 2 any suitable heating means, and 3 any suitable mixing or stirring means. Steam is preferably led in at 4, passes through the coil 2, and exits at 4. A weighed quantity of commercial acid phosphate to which has been added a sufficient quantity of commercial ammonium sulfate to chemically combine with the said phosphate and both in a state of fine subdivision is next placed in the vessel 1. The said phosphate and sulfate are so proportioned as to form the mono- and di-calcium phosphates in accordance with the following equations:—

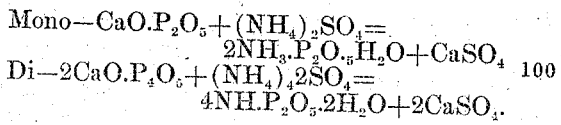

Sufficient water to dissolve the ammonium sulfate having been added to the digestion vessel, heat is turned on, and the temperature maintained at any suitable point below 80° C., preferably about 10 or 15 degrees below 80° C. while the whole charge is constantly agitated by the mechanical stirrer 3 or by other means. After the decomposition of the phosphates, which may be determined by a chemical examination, the contents of the digester is discharged into any suitable filter, through the manhole 6; then thoroughly washed with hot water, and the solution thus obtained is evaporated to crystallization in any suitable apparatus, preferably a vacuum pan. The vacuum I prefer to use is that corresponding to a pressure of from 20 to 25 inches of mercury, and of course the temperature varies according to the degree of vacuum employed.

In the stage of concentrating the solutions from the filter to the point of crystallization, all the secondary ammonium phosphate will be converted into primary ammonium phosphate, and therefore one-half of all the ammonium combined as secondary ammonium phosphate will be driven off as gaseous ammonia; and if desirable this latter may be condensed and recovered in ordinary cooling coils, not shown.

The advantages of my process depend largely upon the comparatively inexpensive production of a phosphate containing all its phosphoric acid "available" as plant food, and at the same time in a form free of sulfate of lime, or other more or less harmful substances, such as sulfate of iron or alum cake, of which commercial acid phosphates always contain a considerable quantity. The conversion of the secondary ammonium phosphate into primary ammonium phosphate may for example, take place at a temperature of 100° C., and at atmospheric pressure.

What I claim is:

1. The process of making phosphate of ammonia from acid calcium phosphate, which consists in mixing in a water solution finely divided crude acid calcium phosphate and ammonium sulfate; in maintaining the temperature of said solution below 80° C.; filtering out the mixed phosphates of ammonia; and in concentrating the filtrate to the point where substantially all the secondary ammonium phosphate that has been formed is converted into primary ammonium phosphate; substantially as described.

2. The process of making phosphate of ammonia from acid calcium phosphate which consists in mixing in a water solution finely divided crude acid calcium phosphate and ammonium sulfate; in maintaining the temperature of said solution below 80° C.; filtering out the mixed phosphates of ammonia; in concentrating the filtrate to the point where substantially all the secondary ammonium phosphate that has been formed is converted into primary ammonium phosphate, thereby driving off gaseous ammonia; and in suitably recovering the latter; substantially as described.

In testimony whereof, I affix my signature, in presence of two witnesses.

SAMUEL PEACOCK.

Witnesses:
T. A. WITHERSPOON,
GEO. B. PITTS.